United States Patent
Nishida et al.

(10) Patent No.: US 6,806,921 B2
(45) Date of Patent: Oct. 19, 2004

(54) LIQUID CRYSTAL DISPLAY DEVICE HAVING IMPACT RESISTANT LIGHT GUIDE AND HOUSING

(75) Inventors: Yoshihide Nishida, Kikuchi-gun (JP); Hiroyuki Nakano, Kikuchi-gun (JP); Yuji Obuchi, Kikuchi-gun (JP)

(73) Assignee: Advanced Display Inc., Kumamoto (JP)

(*) Notice: Subject to any disclaimer, the term of this patent is extended or adjusted under 35 U.S.C. 154(b) by 0 days.

(21) Appl. No.: 10/232,441

(22) Filed: Aug. 29, 2002

(65) Prior Publication Data

US 2003/0043312 A1 Mar. 6, 2003

(30) Foreign Application Priority Data

Aug. 30, 2001 (JP) .......................................... 2001-261705

(51) Int. Cl.[7] .............................................. G02F 1/1333
(52) U.S. Cl. ............................ 349/58; 349/62; 349/63; 349/64; 349/65; 362/26; 362/31; 362/561
(58) Field of Search .............................. 349/58, 62, 63, 349/64, 65; 362/26, 31

(56) References Cited

U.S. PATENT DOCUMENTS

| | | | | |
|---|---|---|---|---|
| 6,034,751 A | * | 3/2000 | Kamiya | 349/60 |
| 6,055,029 A | * | 4/2000 | Kurihara et al. | 349/65 |
| 6,175,396 B1 | * | 1/2001 | Kim et al. | 349/58 |
| 6,512,557 B1 | * | 1/2003 | Miwa | 349/58 |
| 6,552,761 B1 | * | 4/2003 | Seo et al. | 349/58 |
| 6,609,808 B2 | * | 8/2003 | Chen | 362/31 |

* cited by examiner

Primary Examiner—Robert M. Kim
Assistant Examiner—Michael H Caley

(57) ABSTRACT

A liquid crystal display device including a liquid crystal display panel, an illumination unit including a light-conducting plate having a protrusion protruded from a side surface of the light-conducting plate, and a housing having a bottom plate and a casing provided onto a bottom plate peripheral area for holding the light-conducting plate. A depression portion is formed to the casing of the housing. An inside of the bottom plate peripheral area is processed from roots of the end surfaces along the end surfaces so that a first slit which continues to the end surfaces is formed. The casing in a position separated from the end surfaces with a predetermined interval and an inside of the bottom plate peripheral area in this position are processed so that a second slit is formed. A portion of the housing composed of a part of the casing sandwiched between the first slit and the second slit and the bottom plate is supported to the housing in a manner of a fixed beam with respect to a load in the locating direction.

10 Claims, 12 Drawing Sheets

LIQUID CRYSTAL DISPLAY DEVICE HAVING IMPACT RESISTANT LIGHT GUIDE AND HOUSING

BACKGROUND OF THE INVENTION

The present invention relates to a liquid crystal display device. More specifically, it relates to a liquid crystal display device in which a slit is provided in a vicinity of a depression portion for fitting a protrusion of a housing for holding a light-conducting plate thereinto and an impact damage of a protrusion for locating of the light-conducting plate can be avoided.

FIG. 18 is an exploded perspective view for explaining structures of an illumination apparatus of a liquid crystal display device for illuminating a back surface of a liquid crystal display panel and of a housing for holding the illumination apparatus. FIG. 19 is a sectional view showing the illumination apparatus and the housing taken along the line A—A in a state where the illumination apparatus and the housing of FIG. 18 are assembled. A light which is emitted radially from a barshaped fluorescent lamp 8 is reflected by a reflecting plate 3 so as to be condensed onto a side surface of the light-conducting plate 1. Moreover, a rear surface of the light-conducting plate 1 is subject to an irregular reflection process (dot printing or emboss process), and a light reflecting sheet 2 is arranged thereon so as to convert the light entered the light-conducting plate 1 into a uniform plane light source and allow the light to go therefrom. Thereafter, the outgoing light is scattered or converged by various optical sheets 4 such as a diffusion plate and a lens sheet in order to secure predetermined luminance and optical uniformity, and is emitted to a back surface of a liquid crystal panel (not shown).

The illumination apparatus which is composed of the light-conducting plate 1, a light source unit 9 having the fluorescent lamp 8 covered with the reflecting plate 3, the light reflecting sheet 2 and the optical sheets 4 is held by a housing (hereinafter, referred to as a lower frame) 5 which is composed of a bottom plate 5a and a casing 5b arranged on a bottom plate peripheral area. Particularly, protrusions 1a, 1b, 4a, 4b, 6a and 6b which are protruded from a pair of side surfaces are formed on the light-conducting plate 1, the optical sheets 4 and the light reflecting sheet 2, respectively, and the protrusions 1a, 1b, 4a, 4b, 6a and 6b are fitted into depression portions 7a and 7b formed on the casing 5b of the lower frame 5 so that these members are located in a side surface direction (locating direction S).

However, in recent years, thinning and lightening of the liquid crystal display device are desired, and thus a thickness of an acrylic light-conducting plate is being reduced. As a result, it is concerned about occurrence of the following problem.

When the thickness of the light-conducting plate 1 is reduced, mechanical strength of the protrusions of the light-conducting plate 1 is weakened. Specifically, a damage such as a crack occurs on roots of the protrusions 6a and 6b due to impact to the light-conducting plate 1 in the locating direction S, and a serious situation is capable of arising.

SUMMARY OF THE INVENTION

The present invention is devised in order to solve the above problem, and it is an object of the present invention to provide a liquid crystal display device where an impact energy to protrusions of a light-conducting plate is absorbed, and even if a thinning of the light-conducting plate is improved, a damage such as a crack does not occur on roots of the protrusions.

In accordance with a first aspect of the present invention, there is provided a liquid crystal display device including a liquid crystal display panel, an illumination unit including a light-conducting plate having a protrusion protruded from a side surface of the light-conducting plate, and a housing having a bottom plate and a casing provided onto a bottom plate peripheral area for holding the light-conducting plate, wherein a depression portion into which the protrusion is fitted for locating the light-conducting plate in a direction along its side surfaces by both end surfaces is formed to the casing of the housing; an inside of the bottom plate peripheral area is processed from roots of the end surfaces along the end surfaces so that a first slit which continues to the end surfaces is formed; the casing in a position separated from the end surfaces with a predetermined interval and an inside of the bottom plate peripheral area in this position are processed so that a second slit is formed; a portion of the housing which is composed of a part of the casing sandwiched between the first slit and the second slit and the bottom plate is supported to the housing in a manner of a fixed beam with respect to a load in the locating direction.

It is preferable that the portion which is supported in the manner of the fixed beam to the housing with respect to the load in locating bidirection is provided to both ends of the depression portions.

In accordance with a second aspect of the present invention, there is also provided a liquid crystal display device including a liquid crystal display panel, an illumination unit including a light-conducting plate having at least two adjacent protrusions protruded from a side surface, and a housing having a bottom plate and a casing provided onto a bottom plate peripheral area for holding the light-conducting plate, wherein a convex-concave pattern which is composed of depression portions for fitting the protrusions thereinto and a convex rib is formed on the casing of the housing; the light-conducting plate is located in a direction along the side surface by outside end surfaces of the convex-concave pattern and inside end surfaces on both sides of the rib; an inside of the bottom plate peripheral area is processed from roots of the end surfaces along the inside end surfaces of the rib so that slits which continue to the inside end surfaces are formed respectively on both sides of the rib; and a portion of the housing composed of the rib sandwiched by the slits and the bottom plate is supported in a manner of a fixed beam to the housing with respect to a load in a locating direction.

It is preferable that the inside of the bottom plate peripheral area is processed from a root of the end surface along the outside end surface of the convex-concave pattern so that a first slit which continues to the end surface is formed, the casing in a position separated from the outside end surface of the convex-concave pattern with a predetermined interval and the bottom plate peripheral area in this position are processed so that a second slit is formed, and a portion of the housing composed of a part of the casing sandwiched between the first slit and the second slit and the bottom plate is supported in the manner of the fixed beam to the housing with respect to the load in the locating direction.

It is preferable that the portion is provided to both ends of the convex-concave pattern so as to be supported in the manner of the fixed beam to the housing with respect to the load in the locating bidirection.

In accordance with a third aspect of the present invention, there is further provided a liquid crystal display device including a liquid crystal panel, an illumination unit including a light-conducting plate having a protrusion protruded from a side surface, and a housing composed of a bottom plate and a casing provided onto a bottom plate peripheral area for holding the light-conducting plate, wherein a depression portion for fitting the protrusion thereinto is formed on the casing of the housing; the light-conducting plate is located in a direction along the side surface by both end surfaces of the depression portion; roots of the end surfaces, the bottom plate peripheral area which continues to the roots and a part of the casing which is formed by working a position separated from the end surfaces with a predetermined interval are worked into a U shape to form a U-shaped hole; and a portion which is surrounded by the U-shaped hole is supported in a manner of a cantilever to the housing with respect to a load in a locating direction.

It is preferable that the portion is provided to both ends of the depression portion so as to be supported in the manner of the cantilever to the housing with respect to the load in the locating bidirection.

In accordance with a fourth aspect of the present invention, there is still provided a liquid crystal display device including a liquid crystal display panel, an illumination unit including a light-conducting plate having at least adjacent two protrusions protruded from a side surface, and a housing having a bottom plate and a casing provided onto a bottom plate peripheral area for holding the light-conducting plate, wherein a convex-concave pattern which is composed of depression portions for fitting the protrusions thereinto and the a convex rib is formed on the casing of the housing; the light-conducting plate is located in a direction along the side surface by outside end surfaces of the convex-concave pattern and inside end surfaces of both sides of the rib; the bottom plate peripheral area is processed to surround the rib so that the U-shaped hole is formed; and the rib surrounded by the U-shaped hole is supported in a manner of a cantilever to the housing with respect to a load in a locating direction.

It is preferable that root of the outside end surfaces, the bottom plate peripheral area which continues to the roots, and a portion of the casing formed by processing a position separated from the end surfaces with a predetermined interval are processed into a U shape to form a U-shaped hole and a portion surrounded by the U-shaped hole is supported in the manner of the cantilever to the housing with respect to the load in the locating direction.

It is preferable that the portion is provided to both ends of the convex-concave pattern so as to be supported in the manner of the cantilever to the housing with respect to the load in the locating bidirection.

DETAILED DESCRIPTION OF PREFERRED EMBODIMENTS

EMBODIMENT 1

Figure 1:
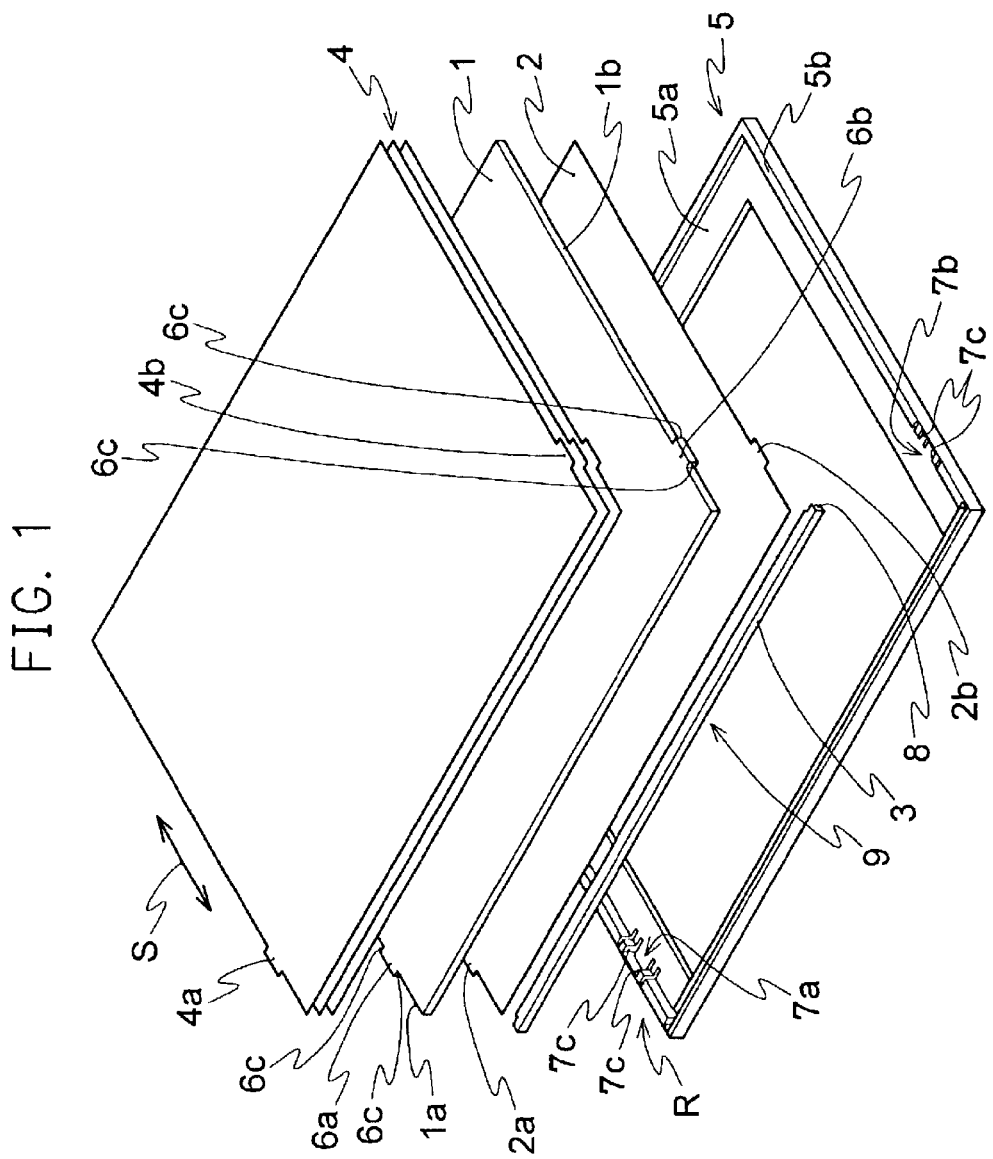
FIG. 1 is an exploded perspective view showing an illumination unit of a liquid crystal display device and a housing according to Embodiment 1.

There will be described below Embodiment 1 in detail with reference to the attached drawings.

A liquid crystal display device according to the present embodiment comprises a liquid crystal display panel, an illumination unit including a light-conducting plate 1 having protrusions 6a and 6b protruded respectively from its side surfaces, a lower frame 5 having a bottom plate 5a for holding the light-conducting plate 1 and a casing 5b provided onto a bottom plate peripheral area 5c.

Figure 5:
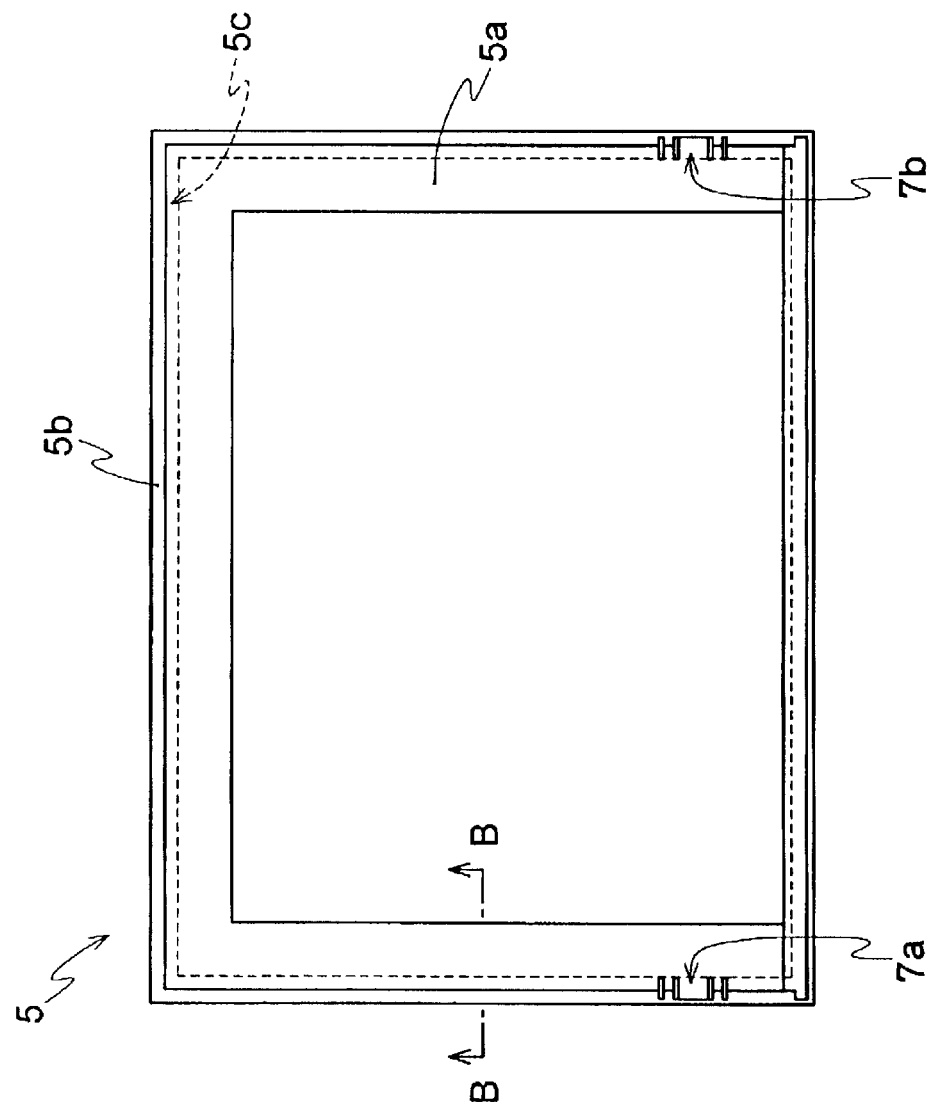
FIG. 5 is a whole plan view of the lower frame.
Figure 6:
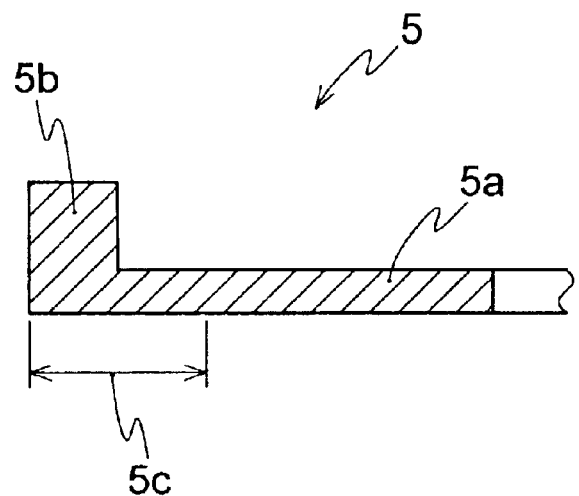
FIG. 6 is a sectional view taken along the line B—B of the lower frame in FIG. 5.

The light-conducting plate 1 is an approximately rectangular member made of resin having excellent light transmittance, such as acrylic resin. Moreover, as shown in FIGS. 5 and 6, the lower frame 5 is composed of the annular bottom plate 5a and the annular casing 5b provided onto the bottom plate peripheral area 5c, and its inside space serves as a holding housing for housing an optical member such as the light-conducting plate 1. The lower frame 5 is generally manufactured in such a manner that the bottom plate 5a and the casing 5b are processed integrally by die molding, and polycarbonate, for example, is used as its material. Moreover, the bottom plate peripheral area 5c is an area outside a broken line in FIG. 5, and the annual casing 5b is provided thereonto, and slits, mentioned later, and/or U-shaped holes are formed on this area.

Meanwhile, the convex protrusions 6a and 6b are provided respectively on a pair of side surfaces 1a and 1b of the light-conducting plate 1 so as to be protruded therefrom. The light-conducting plate 1 is housed in the lower frame 5 in a state where protrusions 6a and 6b are fitted into depression portions 7a and 7b formed on the casing 5b of the lower frame 5. As a result, both end surfaces 6c of the protrusions 6a and 6b abut against both end surfaces 7c of the depression portions 7a and 7b so that the light-conducting plate 1 in the side surface direction S is located. Here, a light reflecting sheet 2 provided onto a rear surface of the light-conducting plate 1 and various optical sheets 4 (prism sheets or diffusion sheets) provided onto the front surface of the light-conducting plate 1 (the side of the liquid crystal display panel) are similarly formed with protrusions 2a, 2b, 4a and 4b for locating.

In order to be capable of allowing a light emitted from a bar-shaped fluorescent lamp 8 to enter the light-conducting plate 1, a light source unit 9 which is composed of a reflecting plate 3 and the fluorescent lamp 8 covered with the reflecting plate 3 is arranged along one end of the light-conducting plate 1. The liquid crystal display panel (not shown) is provided onto the optical sheets 4, and the illumination unit which is composed of the light source unit 9, the reflecting sheet 2, the light-conducting plate 1 and the various optical sheets 4, and the liquid crystal display panel are sandwiched by an upper frame (not shown) and the lower frame 5 so that the liquid crystal display device is finished.

Next, there will be described in detail below structures of the depression portion 7a and slits 10a and 10b in its vicinity formed on the casing 5b of the lower frame 5 with reference to FIGS. 1 and 2.

Locating accuracy at the time of fitting the convex protrusion 6a of the light-conducting plate 1 into the depression portion 7a of the casing 5b is taken into consideration, and their shapes and dimension accuracy are determined. Namely, the end surfaces 7c of the depression portion 7a are brought into close contact with the end surfaces 6c of the protrusion 6a respectively so that the light-conducting plate 1 in the side surface direction S is located. With this arrangement, since both the end surfaces 6c of the protrusion 6a abut against the end surfaces 6c of the depression portion 7a of the lower frame 5 accurately, in the case where an impact force in the locating direction S due to some external pressure is applied to a main body of the light-conducting plate 1, an impact stress is concentrated on a root of the protrusion 6a, and it is concerned that a damage such as a crack possibly occurs on this portion. Particularly, when the light-conducting plate 1 is thinned, impact tolerance of the root of the protrusion 6a is deteriorated, and this problem is further elicited.

Figure 2:
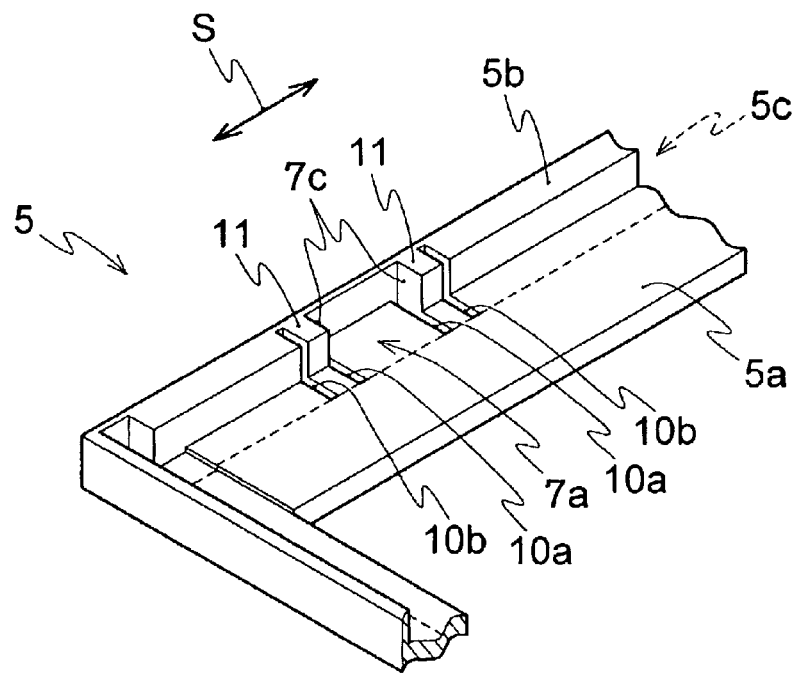
FIG. 2 is an enlarged diagram of an area R shown in FIG. 1, the diagram showing a vicinity of a depression portion provided on a casing of a lower frame for fitting a protrusion of a light-conducting plate thereinto.
Figure 3:
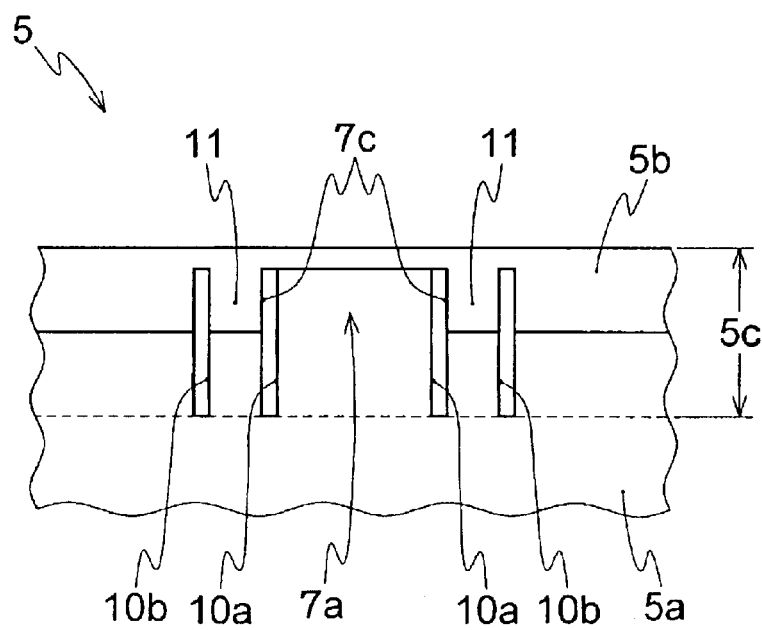
FIG. 3 is a planar schematic diagram showing the vicinity of the depression portion.

In order to avoid such an impact damage, in Embodiment 1 shown in FIGS. 2 and 3, the slits 10a and 10b are provided in the vicinity of the depression portion 7a. More specifically, when the lower frame 5 is manufactured by die molding, the bottom plate peripheral area 5c is molded so that the first slit 10a which continues from the root to the end surfaces 7c is formed along both the end surfaces 7c of the depression portion 7a. Further, the bottom plate peripheral area 5c and the casing 5b are subject to the same process in a position separated from the end surfaces 7c with a predetermined interval so that the second slit 10b is formed approximately parallel with the first slit.

Figure 4:
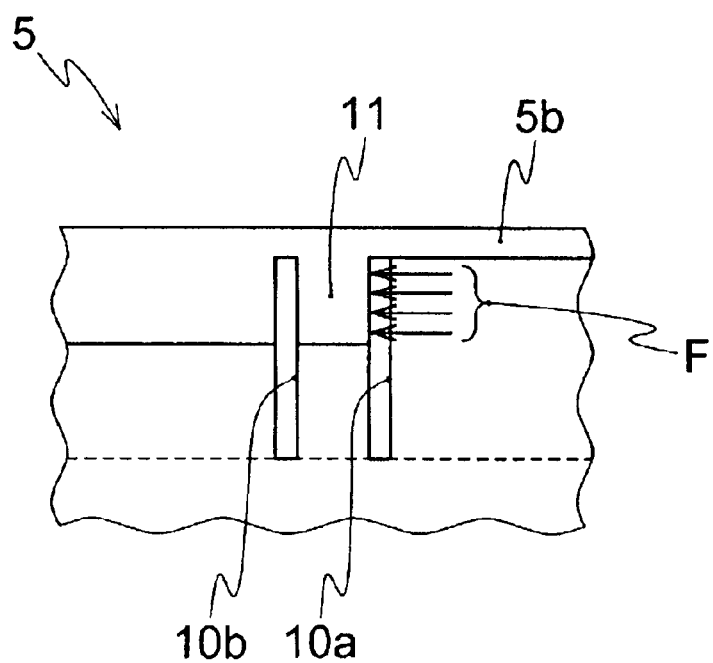
FIG. 4 is a diagram for explaining a function of an impact load to be applied to an impact absorption portion sandwiched between slits formed on the vicinity of the depression portion.

As a result, when viewed locally, an impact absorption portion 11 of a bottom plate piece and a casing piece as a part of the lower frame 5 between the first slit 10a and the second slit 10b is supported to the main body of the lower frame 5 with respect to the load in the locating direction S by a fixed beam structure. FIG. 4 shows a direction of an impact load F to be applied to the impact absorption portion 11 of the lower frame 5 via the protrusion in the case where an impact force F is applied to the light-conducting plate 1. The load F is applied to a direction of arrows in the drawing, and the impact absorption portion 11 of the casing 5b which is sandwiched between the first and second slits 10a and 10b is deformed by the load F to the direction of the load while it is being supported to the lower frame 5 by the fixed beam structure. With this structure, in the case where the impact load F is applied to the locating direction S, since it is considered that a deflection flexible deformation based on the fixed beam occurs on the impact absorption portion 11 of the lower frame 5, the impact absorption portion 11 functions as an elastic body such as rubber or spring so as to serve as an absorption member for absorbing a part of the impact load energy. As a result, since application of the whole impact force energy to the roots of the protrusions 6a and 6b can be avoided, a damage of the roots of the protrusions 6a and 6b can be prevented.

Here, there is explained an example that the impact absorption portion 11 is provided to both two ends of the countered depression portions 7a and 7b so as to be supported to the lower frame 5 in a manner of the fixed beam with respect to the load in the locating bi-direction S. However, in the present invention, in the case where the impact works on the light-conducting plate 1 in one direction, the impact absorption portion 11 can be provided only to one of the depression portions 7a and 7b.

EMBODIMENT 2

There will be explained below another structure where the absorbing effect is produced by the fixed beam structure.

Figure 7:
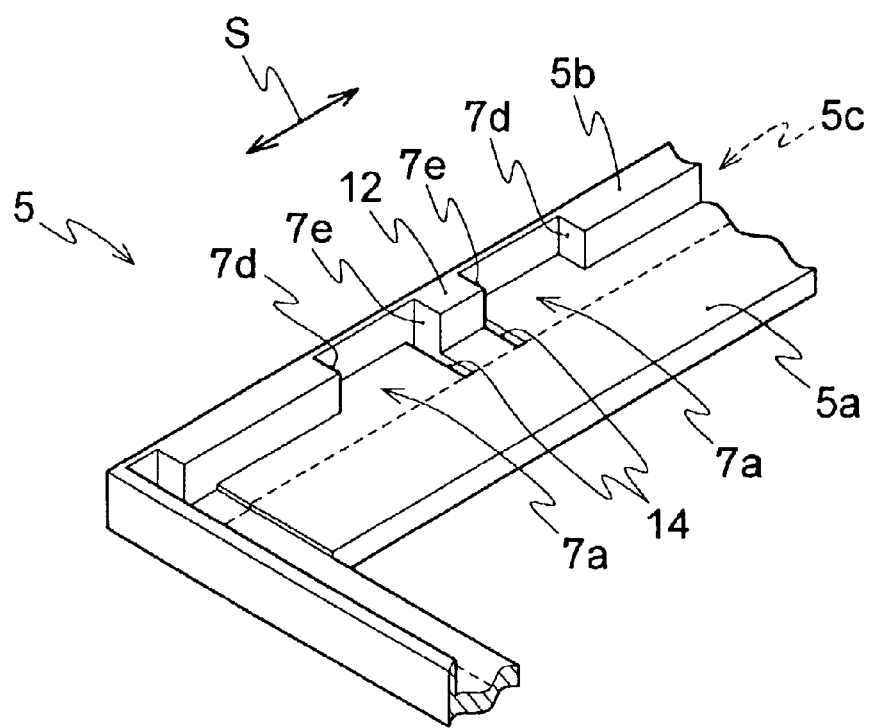
FIG. 7 is a perspective view showing the depression portions provided to the casing of the lower frame and the slits on the vicinity of the depression portions in order to fit the protrusions of the light-conducting plate thereinto in Embodiment 2.
Figure 8:
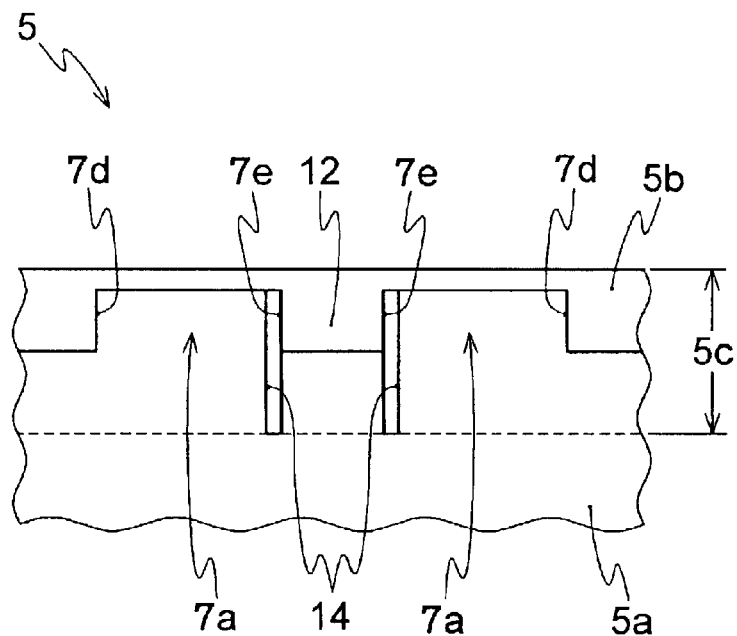
FIG. 8 is a planar schematic diagram showing the vicinity of the depression portions of FIG. 7.

FIG. 7 is a perspective view showing the depression portions and the slits provided onto the casing of the lower frame in order to fit the protrusions of the light-conducting plate thereinto in Embodiment 2. FIG. 8 is a planar schematic diagram showing the vicinity of the depression portions in FIG. 7. Here, the structure is different from the structure in FIG. 2 in that a convex-concave pattern which is composed of the two adjacent depression portions 7a and one convex rib 12 is formed on the casing, and two protrusions which are fitted into the two depression portions 7a are formed on the side surface of the countered light-conducting plate. With the structure of Embodiment 2, since the end surfaces 6c (see FIG. 1) of the protrusions of the light-conducting plate are allowed to abut against both outside end surfaces 7d of the convex-concave pattern and inside end surfaces 7e on both sides of the rib, the advantageous effect which enables more accurate locating is produced.

Meanwhile, in order to absorb the impact load, the bottom plate peripheral area 5c is subject to a die molding work and two slits 14 which continue to the inside end surfaces 7e of both the sides of the rib 12 are formed. The portion of the lower frame 5 which is composed of the rib 12 sandwiched between the slits 14 and the bottom plate 5a is supported to the lower frame 5 by the fixed beam structure with respect to the load in the locating direction. Therefore, the portion which is composed of the rib 12 and the bottom plate 5a can absorb the impact load energy in the locating direction S by means of elastic deflection.

Figure 9:
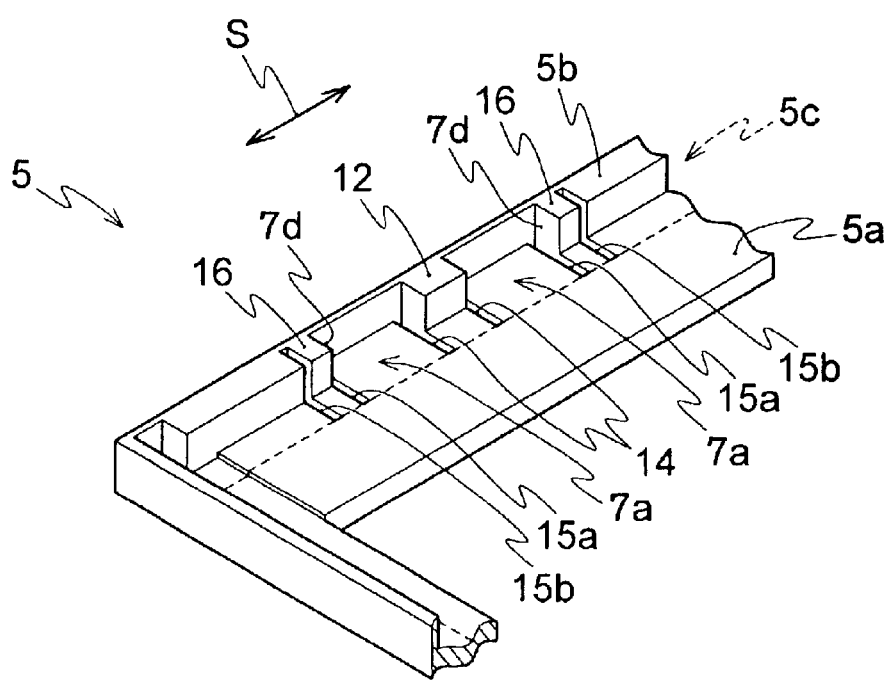
FIG. 9 is a perspective view for explaining an example in which a structure that an impact load energy is absorbed by the slits formed on the vicinity of an outside end surfaces in Embodiment 2 is added.
Figure 10:
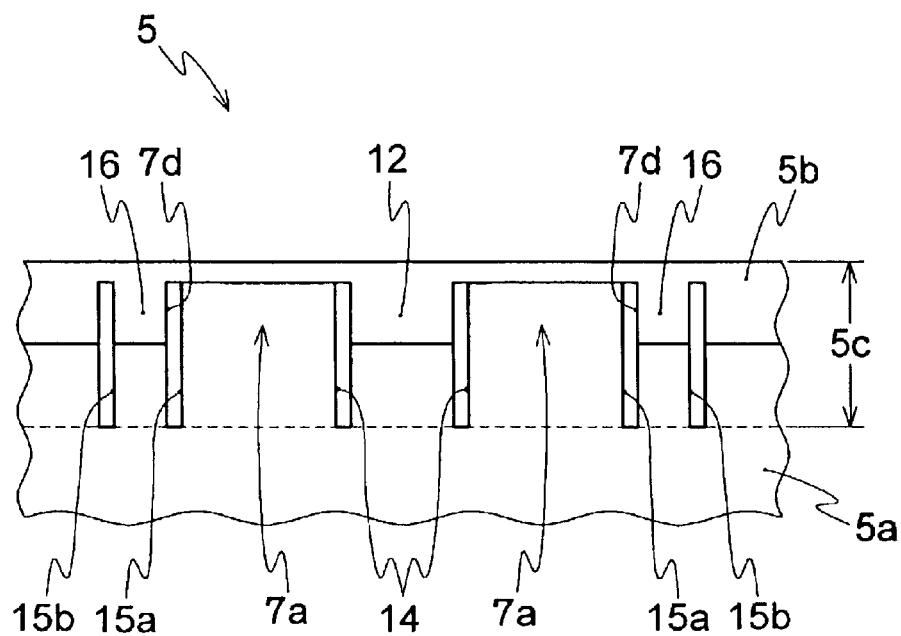
FIG. 10 is a planar schematic diagram showing the vicinity of the depression portions in FIG. 9.

Further, in the present invention, as shown in FIGS. 9 and 10, a structure where the impact load energy is absorbed by slits 15a and 15b formed in the vicinities of the outside end surfaces 7d can be added. Namely, the bottom plate peripheral area 5c is processed so that the slit 15a which continues to the outside end surface 7d is formed, and the casing 5b and the bottom plate peripheral area 5c are processed so that the other slit 15b is formed approximately parallel with the outside end surface 7d in a position separated from the outside end surface 7d with a predetermined interval. Since an impact absorbing portion 16 between the slits 15a and 15b which is composed of the casing 5b and the bottom plate 5a is supported to the lower frame 5 by the fixed beam structure with respect to the locating direction S, the impact load energy of the roots of the protrusions can be absorbed. When the fixed beam structure is provided to three places, the impact energy can be dispersed. For this reason, the impact load energy to be applied to the protrusions can be reduced more effectively.

Here, there is explained the two adjacent depression portions as an example, but a number of the adjacent depression portions is not limited to this, and when three or more depression portions are provided and the protrusions of the light-conducting plate are fitted thereinto, the locating accuracy can be further improved.

EMBODIMENT 3

There will be described in detail below Embodiment 3 with reference to FIGS. 11 through 13.

Figure 11:
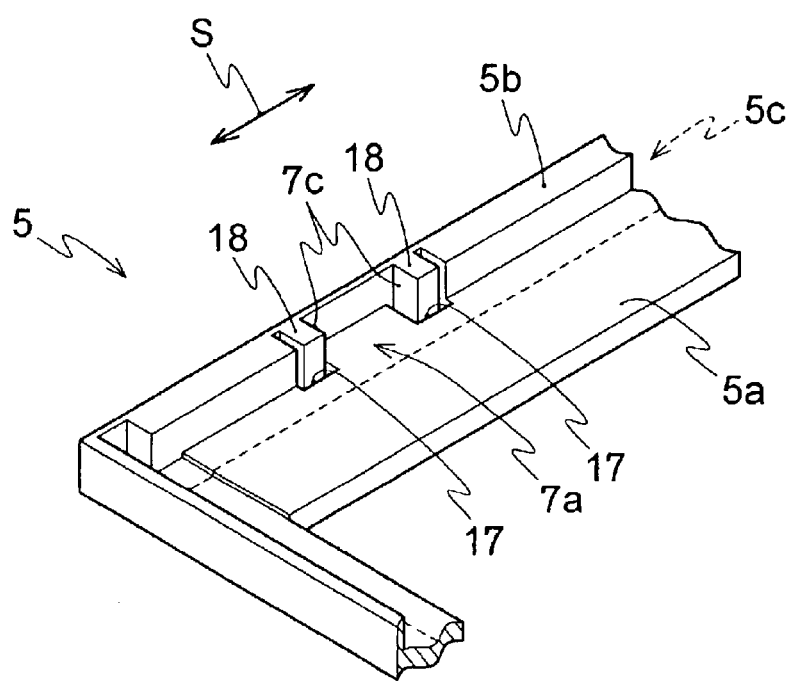
FIG. 11 is a perspective view showing the depression portions and U-shaped holes formed on the casing of the lower frame in Embodiment 3.

FIG. 11 is a perspective view showing the depression portion and the U-shaped holes formed on the casing of the lower frame. FIG. 12 is a planar schematic diagram showing the vicinity of the depression portion. FIG. 13 is a diagram for explaining the function of the load to be applied to the impact absorption portion formed in the vicinity of the depression portion and surrounded by the U-shaped holes.

Here, since the function for locating the light-conducting plate by means of the depression portion is the same as that described in Embodiment 1, the description relating to the locating in the depression portions is omitted.

Figure 12:
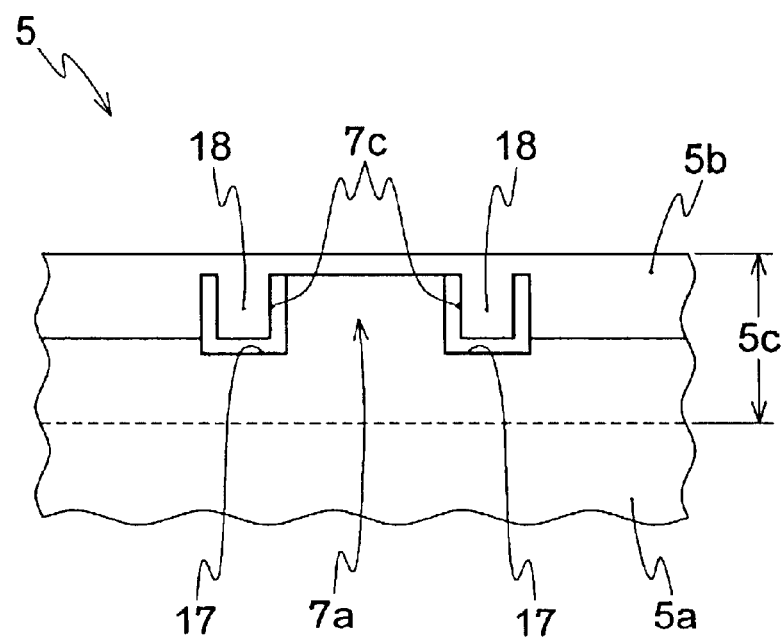
FIG. 12 is a planar schematic diagram showing the vicinity of the depression portion in FIG. 11.
Figure 13:
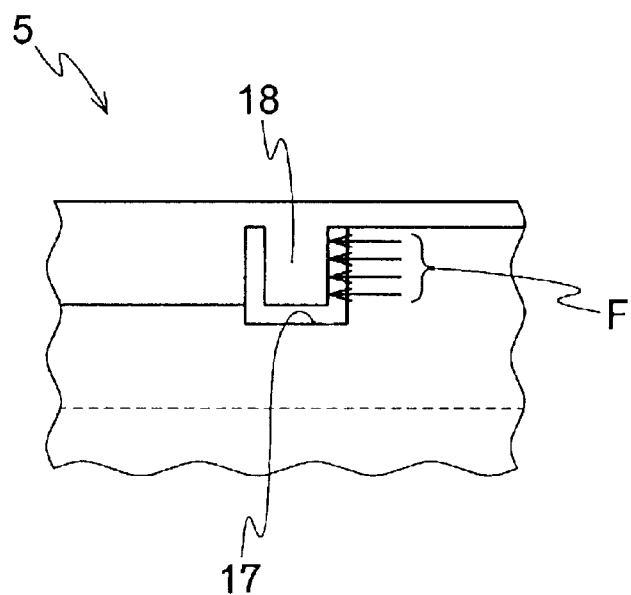
FIG. 13 is a diagram for explaining a function of a load to be applied to an impact absorption portion surrounded by the slits formed in the vicinity of the depression portion.

As shown in FIGS. 11 and 12, the bottom plate peripheral area 5c which continues to the end surfaces 7c of the depression portion 7a, the casing 5b in the positions separated from the end surfaces 7c with a predetermined interval and the bottom plate peripheral area 5c are subject to the die molding work into a U shape so that U-shaped holes 17 are formed.

As a result, impact absorption portions 18 surrounded by the U-shaped holes 17 are locally supported to the lower frame 5 by a cantilever structure with respect to the load in the locating direction S. FIG. 13 shows a direction of the load F to be applied to the impact absorption portions 18 of the lower frame 5 via the protrusion in the case where the impact force is applied to the light-conducting plate. The load F is applied to the direction of arrows in the drawing, and the impact absorption portions 18 surrounded by the U-shaped holes 17 are deformed by the load F to the load direction while it is being supported to the lower frame 5 by the cantilever structure. With this structure, in the case where the impact load F is applied to the locating direction S, deflection elastic deformation based on the cantilever beam occurs on the impact absorption portions 18, and the impact absorption portions 18 function as an elastic body such as rubber or spring and serves as an absorption member for absorbing a part of the impact load energy. Therefore, since the whole impact load energy is not applied to the roots of the protrusions, a damage of the root of the protrusion can be obviated.

EMBODIMENT 4

There will be explained below another structure where the absorption effect is produced by the cantilever structure.

Figure 14:
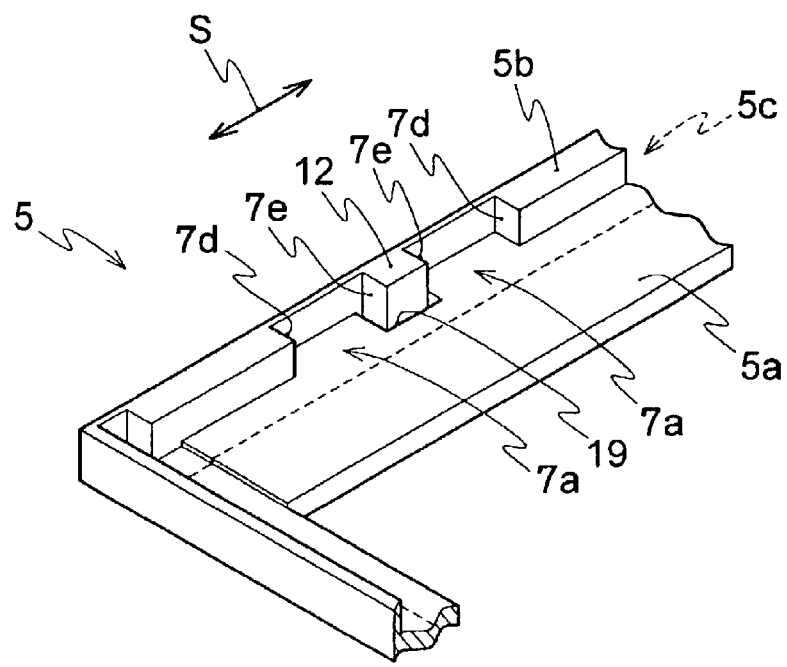
FIG. 14 is a perspective view showing the depression portions and a U-shaped hole in its vicinity formed on the casing of the lower frame in order to fit the protrusion portions of the light-conducting plate thereinto in Embodiment 4.
Figure 15:
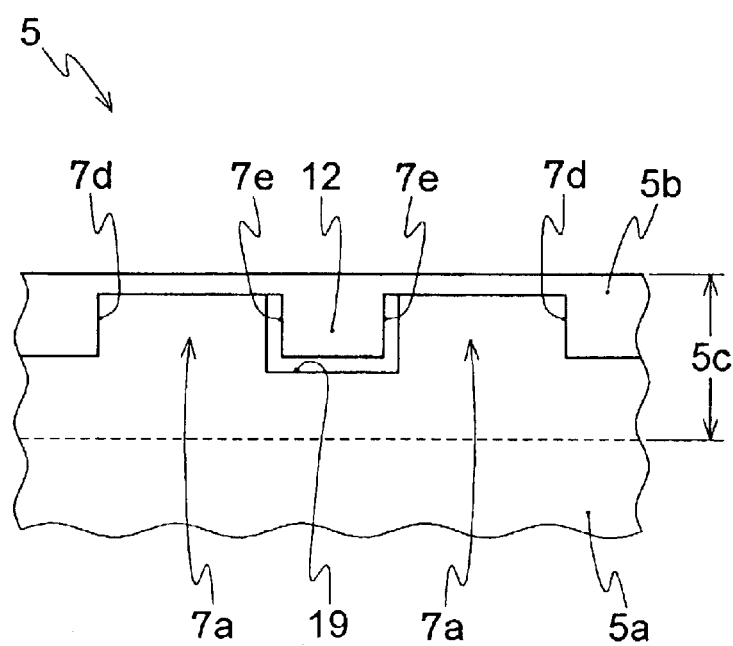
FIG. 15 is a planar schematic diagram showing the vicinity of the depression portions in FIG. 14.

FIG. 14 is a perspective view showing the depression portions formed on the casing of the lower frame and the U-shaped hole in their vicinity for fitting the protrusions of the light-conducting plate thereinto. FIG. 15 is a planar schematic diagram showing the vicinity of the depression portions of FIG. 14. Here, the structure is different from the cantilever structure shown in FIG. 11 in that the convex-concave pattern which is composed of the adjacent two depression portions 7a and the one convex rib 12 is formed on the casing 5b. The object of adoption of the convex-concave pattern is to secure the locating accuracy of the light-conducting plate in the side surface direction by means of the outside end surfaces 7d and the inside end surfaces 7e as explained in Embodiment 2.

Meanwhile, in order to absorb the impact load, the bottom plate peripheral area 5c is subject to the die molding work so that a U-shaped hole 19 which surrounds the rib 12 is formed. The rib 12 surrounded by the U-shaped hole 19 is supported to the lower frame 5 by the cantilever structure with respect to the load in the locating direction S. Therefore, the rib 12 can absorb the impact load energy in the locating direction S by means of deflection elastic deformation.

Figure 16:
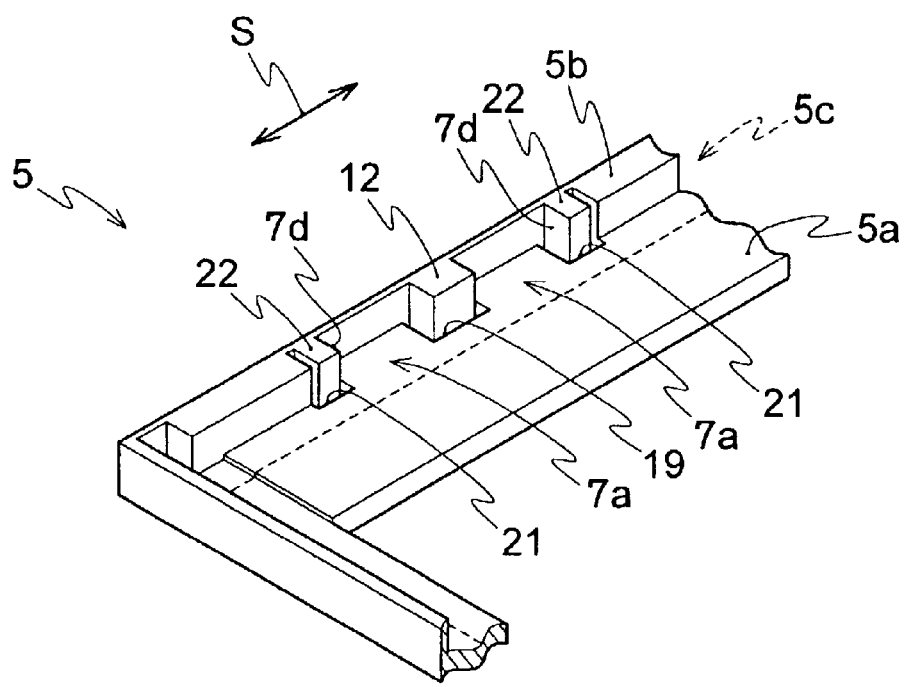
FIG. 16 is a perspective view for explaining an example in which a structure that the impact load energy is absorbed by the U-shaped hole formed in the vicinity of the outside end surface in Embodiment 4 is added.
Figure 17:
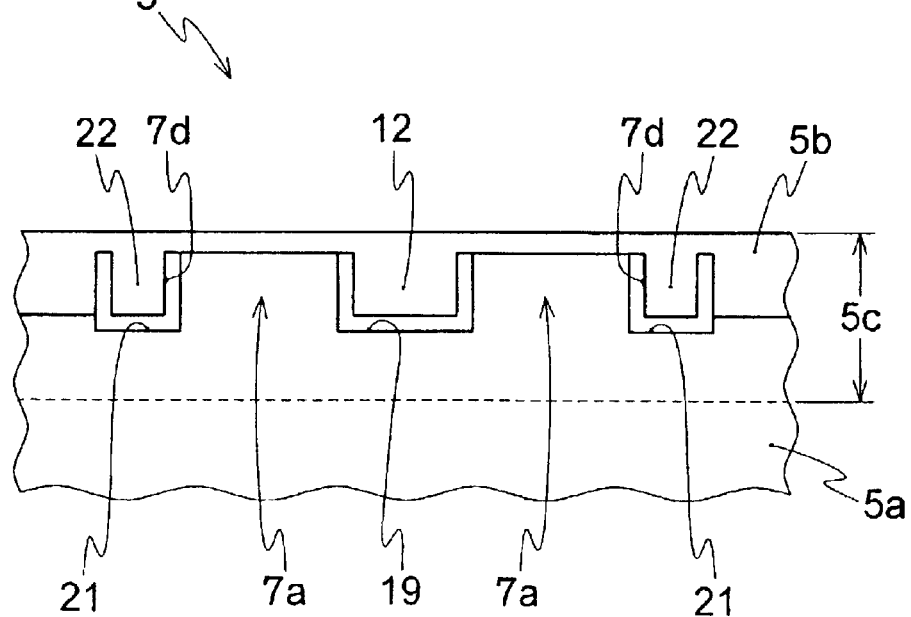
FIG. 17 is a planar schematic diagram showing the vicinity of the depression portions of FIG. 16.
Figure 18:
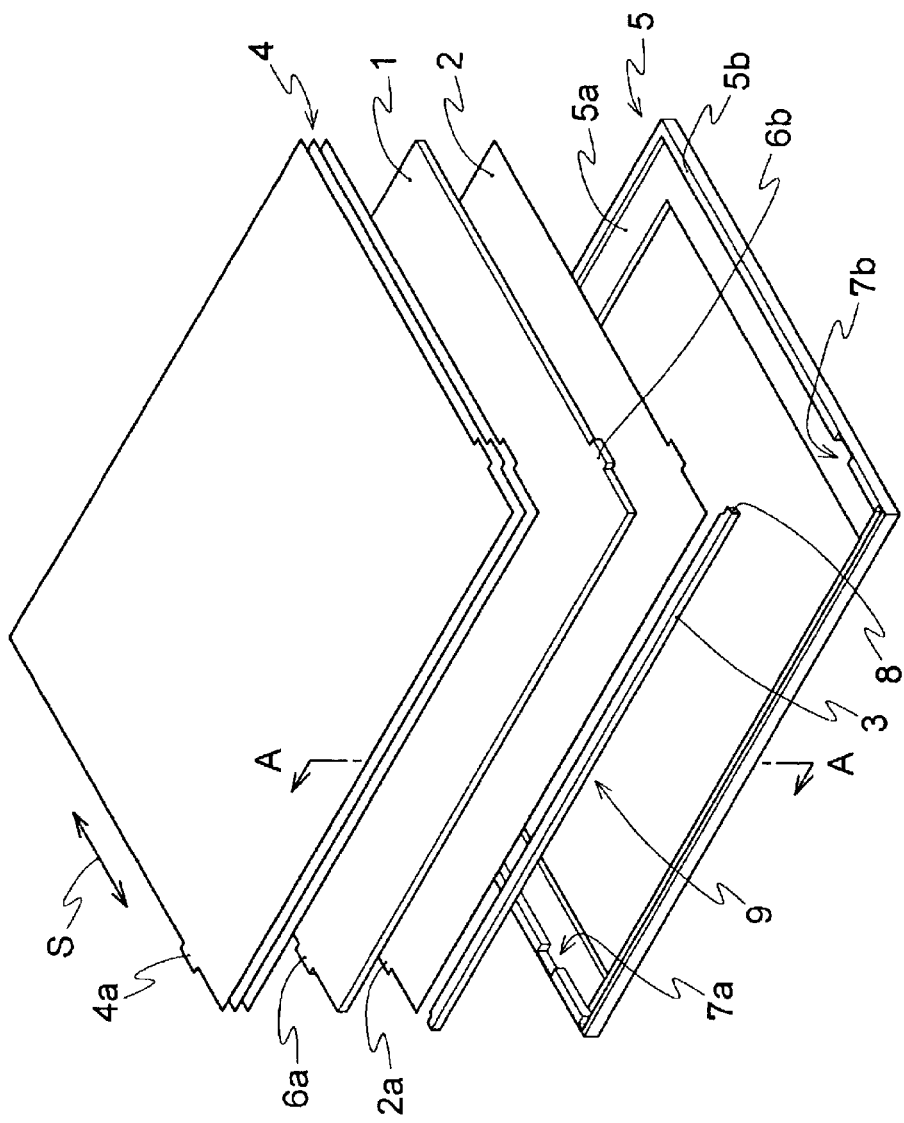
FIG. 18 is an exploded perspective view showing an illumination unit of a liquid crystal display device for illuminating a back surface of a liquid crystal panel and a casing for holding the illumination unit.
Figure 19:
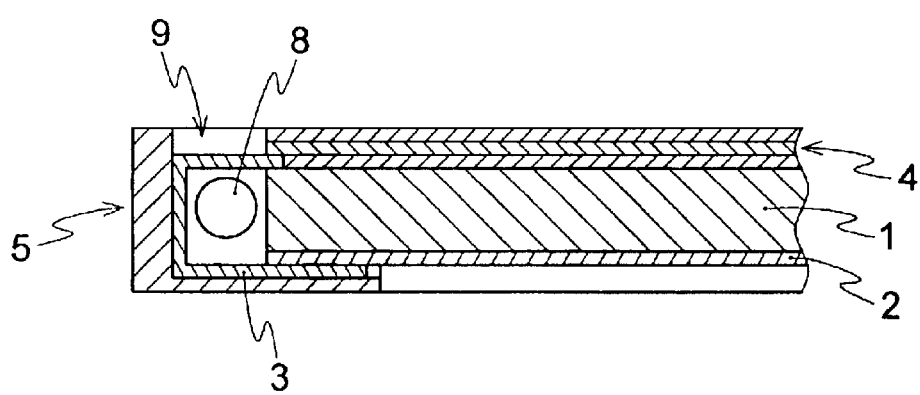
FIG. 19 is a sectional view of the illumination unit and the casing taken along the line A—A of FIG. 18 in a state where the illumination unit and the casing are assembled.

Further, in the present invention, as shown in FIGS. 16 and 17, a structure that the impact load energy is absorbed by U-shaped holes 21 formed in the vicinities of the outside end surfaces 7d can be added. Namely, the roots of the outside end surfaces 7d, the bottom plate peripheral area 5c which continues to the roots, and a part of the casing 5b which is formed by processing a position separated from the outside end surfaces 7d with a predetermined intervals, are subject to the die molding work into a U shape so that U-shaped holes 21 are formed. As a result, impact absorption portions 22 surrounded by the U-shaped holes 21 are supported to the lower frame 5 by the cantilever structure with respect to the load in the locating direction S and can absorb the impact load energy on the roots of the protrusions. Since the cantilever structure is provided to three places so as to be capable of dispersing the impact energy, the impact load energy to be applied to the protrusions can be reduced more effectively.

Here, there is explained the adjacent two depression portions as an example, but a number of the depression portions is not limited to this, and when three or more depression portions are provided and the protrusions of the light-conducting plate is fitted thereinto, the locating accuracy can be further improved.

As explained above, the inventions according to the first and second aspects, can provide the liquid crystal display device, in which a plurality of slits are provided on the vicinity of the depression portion of the casing for fitting the protrusion of the light-conducting plate thereinto, and a portion surrounded by the slits is supported to the housing by means of the fixed beam, and since this portion absorbs the impact energy with respect to the impact load of the light-conducting plate by means of elastic deflection deformation, even if the light-conducting plate is thinned, a damage such as a crack is not allowed to occur on the roots of the protrusions of the light-conducting plate.

The inventions according to the third and fourth aspects can provide the liquid crystal display device, in which a U-shaped hole is provided to the vicinity of the depression portion of the casing for fitting the protrusion of the light-conducting plate thereinto and the portion surrounded by the U-shaped hole is supported to the housing by means of the cantilever, and since this portion absorbs the impact energy with respect to the impact load of the light-conducting plate by means of elastic deflection deformation, even if the light-conducting plate is thinned, a damage such as a crack is not allowed to occur on the roots of the protrusions of the light-conducting plate.

What is claimed is:

1. A liquid crystal display device comprising a liquid crystal display panel, an illumination unit including a light-conducting plate having a protrusion protruded from a side surface of the light-conducting plate, and a housing having a bottom plate and a casing provided onto a bottom plate peripheral area for holding the light-conducting plate, wherein a depression portion into which the protrusion is fitted for locating the light-conducting plate in a direction along its side surfaces by both end surfaces is formed to the casing of the housing;

an inside of the bottom plate peripheral area is processed from roots of the end surfaces along the end surfaces so that a first slit which continues to the end surfaces is formed;

the casing in a position separated from the end surfaces with a predetermined interval and an inside of the bottom plate peripheral area in this position are processed so that a second slit is formed; and a portion of the housing which is composed of a part of the casing sandwiched between the first slit and the second slit and the bottom plate is supported to the housing in a manner of a fixed beam with respect to a load in the locating direction.

2. The liquid crystal display device of claim 1, wherein the portion which is supported in the manner of the fixed beam to the housing with respect to the load in locating bidirection is provided to both ends of the depression portions.

3. A liquid crystal display device comprising a liquid crystal display panel, an illumination unit including a light-conducting plate having at least two adjacent protrusions protruded from a side surface, and a housing having a bottom plate and a casing provided onto a bottom plate peripheral area for holding the light-conducting plate, wherein a convex-concave pattern which is composed of depression portions for fitting the protrusions thereinto and a convex rib is formed on the casing of the housing;

the light-conducting plate is located in a direction along the side surface by outside end surfaces of the convex-concave pattern and inside end surfaces on both sides of the rib;

an inside of the bottom plate peripheral area is processed from roots of the end surfaces along the inside end surfaces of the rib so that slits which continue to the inside end surfaces are formed respectively on both sides of the rib;

and a portion of the housing composed of the rib sandwiched by the slits and the bottom plate is supported in a manner of a fixed beam to the housing with respect to a load in a locating direction.

4. The liquid crystal display device of claim 3, wherein the inside of the bottom plate peripheral area is processed from a root of the end surface along the outside end surface of the convex-concave pattern so that a first slit which continues to the end surface is formed; the casing in a position separated from the outside end surface of the convex-concave pattern with a predetermined interval and the bottom plate peripheral area in this position are processed so that a second slit is formed; and a portion of the housing composed of a part of the casing sandwiched between the first slit and the second slit and the bottom plate is supported in the manner of the fixed beam to the housing with respect to the load in the locating direction.

5. The liquid crystal display device of claim 4, wherein the portion is provided to both ends of the convex-concave pattern so as to be supported in the manner of the fixed beam to the housing with respect to the load in the locating bidirection.

6. A liquid crystal display device comprising a liquid crystal panel, an illumination unit including a light-conducting plate having a protrusion protruded from a side surface, and a housing composed of a bottom plate and a casing provided onto a bottom plate peripheral area for holding the light-conducting plate, wherein a depression portion for fitting the protrusion thereinto is formed on the casing of the housing; the light-conducting plate is located in a direction along the side surface by both end surfaces of the depression portion;

roots of the end surfaces, the bottom plate peripheral area which continues to the roots and a part of the casing which is formed by working a position separated from the end surfaces with a predetermined interval are worked into a U shape to form a U-shaped hole;

and a portion which is surrounded by the U-shaped hole is supported in a manner of a cantilever to the housing with respect to a load in a locating direction.

7. The liquid crystal display device of claim 6, wherein the portion is provided to both ends of the depression portion so as to be supported in the manner of the cantilever to the housing with respect to the load in the locating bidirection.

8. A liquid crystal display device comprising a liquid crystal display panel, an illumination unit including a light-conducting plate having at least two adjacent protrusions protruded from a side surface, and a housing having a bottom plate and a casing provided onto a bottom plate peripheral area for holding the light-conducting plate, wherein a convex-concave pattern which is composed of depression portions for fitting the protrusions thereinto and a convex rib is formed on the casing of the housing;

the light-conducting plate is located in a direction along the side surface by outside end surfaces of the convex-concave pattern and inside end surfaces of both sides of the rib; the bottom plate peripheral area is processed to surround the rib so that a U-shaped hole is formed; and the rib surrounded by the U-shaped hole is supported in a manner of a cantilever to the housing with respect to a load in a locating direction.

9. The liquid crystal display device of claim 8, wherein root of the outside end surfaces, the bottom plate peripheral area which continues to the roots, and a portion of the casing formed by processing a position separated from the end surfaces with a predetermined interval are processed into a U shape to form a U-shaped hole is formed, and a portion surrounded by the U-shaped hole is supported in the manner of the cantilever to the housing with respect to the load in the locating direction.

10. The liquid crystal display device of claim 9, wherein the portion is provided to both ends of the convex-concave pattern so as to be supported in the manner of the cantilever to the housing with respect to the load in the locating bidirection.

* * * * *